US012647270B2

(12) United States Patent
Taneja et al.

(10) Patent No.: US 12,647,270 B2
(45) Date of Patent: Jun. 2, 2026

(54) METHOD AND SYSTEM FOR VERIFYING USER AUTHORIZATION USING ZERO-PROOF VERIFICATION

(71) Applicant: Bank of America Corporation, Charlotte, NC (US)

(72) Inventors: Pushkar Taneja, Hyderabad (IN); Suryanarayana Adivi, Hyderabad (IN); Shailendra Singh, Thane West (IN); Jemlin Lucas, Coppell, TX (US); Sunilkumar Sriperambudur, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 186 days.

(21) Appl. No.: 18/733,736

(22) Filed: Jun. 4, 2024

(65) Prior Publication Data

US 2026/0046133 A1      Feb. 12, 2026

(51) Int. Cl.
*H04L 9/32* (2006.01)
*G06Q 30/0601* (2023.01)

(52) U.S. Cl.
CPC ....... *H04L 9/3218* (2013.01); *G06Q 30/0609* (2013.01)

(58) Field of Classification Search
CPC .......................... H04L 9/3218; G06Q 30/0609
See application file for complete search history.

(56) References Cited

U.S. PATENT DOCUMENTS

| | | | |
|---|---|---|---|
| 8,745,585 B2 | 6/2014 | Watters et al. | |
| 10,042,744 B2 | 8/2018 | Herrin et al. | |
| 10,108,531 B2 | 10/2018 | Hotra et al. | |
| 11,099,237 B2 | 8/2021 | Nochilur et al. | |
| 11,243,516 B2 | 2/2022 | Gelbke et al. | |
| 11,494,295 B1 | 11/2022 | Sirianni et al. | |
| 11,568,134 B2 | 1/2023 | Sharma et al. | |
| 11,704,186 B2 | 7/2023 | Li | |
| 11,816,479 B2 | 11/2023 | Ray et al. | |
| 11,928,047 B2 | 3/2024 | Karri et al. | |
| 2015/0347212 A1 | 12/2015 | Bartley et al. | |
| 2018/0232299 A1 | 8/2018 | Shani et al. | |
| 2020/0322128 A1* | 10/2020 | Hu ........................... | G06F 9/54 |
| 2021/0119769 A1* | 4/2021 | Trevethan ............. | H04L 9/0637 |
| 2021/0263841 A1 | 8/2021 | Mo et al. | |
| 2021/0295342 A1* | 9/2021 | Zhang .................. | G06Q 20/389 |
| 2021/0377041 A1* | 12/2021 | Covaci ................... | H04L 63/12 |
| 2021/0397544 A1 | 12/2021 | Liu et al. | |
| 2021/0397545 A1 | 12/2021 | Liu et al. | |
| 2022/0014502 A1* | 1/2022 | Gauthier ................. | H04L 9/30 |
| 2022/0083320 A1 | 3/2022 | Balinsky et al. | |
| 2022/0239486 A1* | 7/2022 | Wahab ................. | H04L 9/3252 |
| 2023/0289444 A1 | 9/2023 | Ermey | |
| 2023/0306349 A1 | 9/2023 | Kadakia et al. | |

(Continued)

*Primary Examiner* — Yonas A Bayou

(57) ABSTRACT

In response to receiving a first request from a user to determine eligibility to perform a data interaction, the user is prompted to provide eligibility information. An eligibility result is determined by inputting the eligibility information into an evaluation algorithm. A zero-knowledge proof of the eligibility result is generated. In response to receiving a second request from the user to perform the data interaction, the zero-knowledge proof is verified. When the zero-knowledge proof is found to be valid, the data interaction requested by the user is initiated.

20 Claims, 2 Drawing Sheets

100 ⟶

(56)          References Cited

U.S. PATENT DOCUMENTS

| | | |
|---|---|---|
| 2023/0342281 A1 | 10/2023 | Haile |
| 2024/0004747 A1 | 1/2024 | Nishino et al. |
| 2024/0078541 A1* | 3/2024 | Trevethan .......... G06Q 20/0655 |
| 2025/0150275 A1* | 5/2025 | Anadollu ................ G06F 21/64 |
| 2025/0200562 A1* | 6/2025 | Oh ..................... G06Q 20/3827 |
| 2025/0200568 A1* | 6/2025 | Wright .............. G06Q 20/3678 |
| 2025/0217801 A1* | 7/2025 | Wright ................. G06Q 20/389 |
| 2025/0219830 A1* | 7/2025 | Gan ...................... H04L 9/3218 |
| 2025/0373433 A1* | 12/2025 | Guo ........................ H04L 9/008 |

* cited by examiner

METHOD AND SYSTEM FOR VERIFYING USER AUTHORIZATION USING ZERO-PROOF VERIFICATION

TECHNICAL FIELD

The present disclosure relates generally to network communication, and more specifically to a method and system for verifying user authorization using zero-proof verification.

BACKGROUND

In some cases, to perform a data interaction within the computing infrastructure, a user may need to satisfy an eligibility criterion defined by an entity that owns or manages the computing infrastructure or a portion thereof. Before being able to perform the requested data interaction, the user typically needs to prove eligibility to perform the data interaction by provide information that is used by the entity to determine whether the user satisfies the eligibility criterion. This information may include private and/or sensitive user information. Users may not desire to share private and sensitive information to demonstrate their eligibility to perform data interactions as it may lead to data theft, identity theft and targeted promotions.

SUMMARY

The system and method implemented by the system as disclosed in the present disclosure provide technical solutions to the technical problems discussed above by evaluating eligibility of a user to perform a data interaction without disclosure of certain user information.

For example, the disclosed system and methods provide the practical application of proving eligibility of a user to perform a data interaction without disclosing specific information otherwise needed to prove eligibility of the user. As described in accordance with embodiments of the present disclosure, in response to receiving a first request from a user to determine eligibility of the user to perform a data interaction, an eligibility manager prompts the user to provide eligibility information associated with the user, wherein the user is eligible to perform the data interaction when the eligibility information associated with the user satisfies the eligibility criteria. Upon receiving the eligibility information associated with the user, the eligibility manager determines an eligibility result by inputting the eligibility information into the evaluation algorithm, wherein the eligibility result indicates the eligibility of the user to perform the data interaction based on the eligibility criteria. In response to determining that the user is eligible to perform the data interaction, the eligibility manager generates a zero-knowledge proof of the eligibility of the user to perform the data interaction, wherein the zero-knowledge proof does not include the eligibility information received from the user. Upon receiving a second request from the user to perform the data interaction, the eligibility manager verifies the zero-knowledge proof of the eligibility of the user to perform the data interaction by running a verification algorithm. The eligibility manager initiates the data interaction requested by the user in response to determining that the zero-knowledge proof is valid.

At no point during the evaluation of the eligibility of the user to perform the data interaction including generation of the zero-knowledge proof and verification of the zero-knowledge proof, the specific eligibility information associated with the user or any portion thereof is disclosed or revealed. This raises the overall data privacy and data security of the computing network and avoids theft of sensitive and private user data.

Thus, the disclosed system and method generally improve technology associated with data privacy and data security in computing systems.

The disclosed system and methods provide the practical application of improving performance of computing devices and computing networks that process data interactions requested by users, For example, by intelligently evaluating and validating eligibility of the user to perform a data interaction and performing the data interaction only when the user is eligible to perform the data interaction, the disclosed system and method avoid processing data interactions when users are ineligible to perform those data interactions. This saves processing resources that would otherwise be used to process data interactions ineligible users. Saving processing resources improves processing efficiency of computing systems employed to process the data interactions. Thus, the disclosed system and methods generally improve the technology relating to computing systems and computing networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
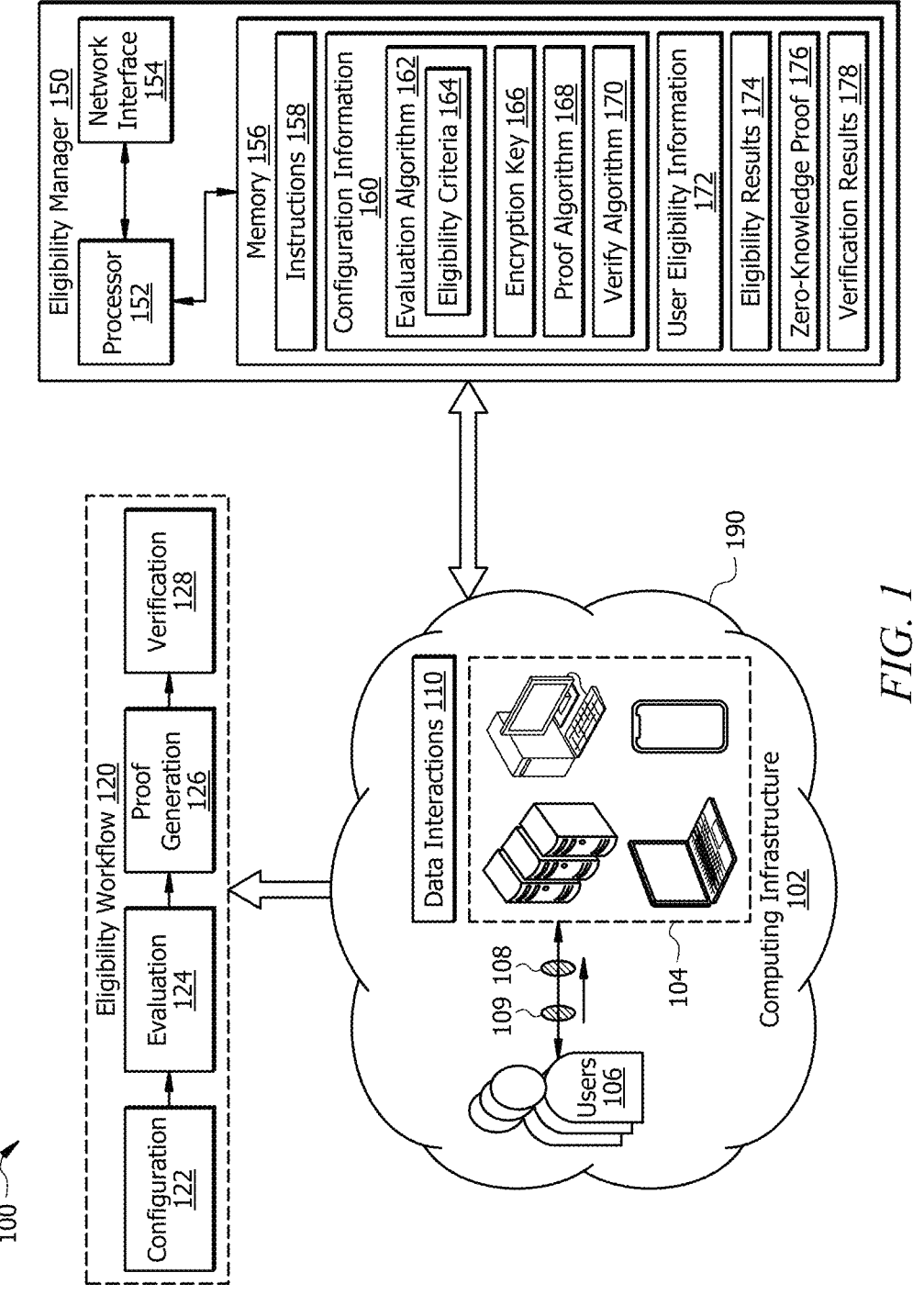
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 190. Computing infrastructure 102 may include a plurality of hardware and software components. The hardware components may include, but are not limited to, computing nodes 104 such as desktop computers, smartphones, tablet computers, laptop computers, servers and data centers, mainframe computers, virtual reality (VR) headsets, augmented reality (AR) glasses and other hardware devices such as printers, routers, hubs, switches, and memory all connected to the network 190. Software components may include software applications that are run by one or more of the computing nodes 104 including, but not limited to, operating systems, user interface applications, third party software, database management software, service management software, mainframe software, metaverse software, AI tools and other customized software programs (e.g., eligibility manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the eligibility manager 150. In one embodiment, at least a portion of the computing infrastructure 102 may be representative of an Information Technology (IT) infrastructure of an organization.

One or more of the computing nodes 104 may be operated by a user 106. For example, a computing node 104 may provide a user interface using which a user 106 may operate the computing node 104 to perform data interactions 110 within the computing infrastructure 102. In certain embodiments, a data interaction 110 performed by a user 106 may include registering with an entity that owns or manages the computing infrastructure 102 to receive a product or service. For example, a user 106 may request to register with an entity that owns or manages the computing infrastructure 102 and may receive one or more services provided by at least a portion of the computing infrastructure 102. For example, a user 106 may be register with the entity to store a data file having data objects at a server of the computing infrastructure 102 and perform one or more data interactions associated with the data file such as transferring data objects from the data file to another data file and/or receiving data objects into the data file from another data file.

One or more computing nodes 104 of the computing infrastructure 102 may be representative of a computing system which hosts software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., eligibility manager 150) as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

In some cases, to perform a data interaction 110 within the computing infrastructure 102, a user 106 may need to satisfy an eligibility criterion (e.g., eligibility criterion 164) defined by an entity that owns or manages the computing infrastructure 102 or a portion thereof. Before being able to perform the requested data interaction 110, the user 106 typically needs to prove eligibility to perform the data interaction by provide information that is used by the entity to determine whether the user 106 satisfies the eligibility criterion. This information may include private and/or sensitive user information. For example, to open a bank account a user 106 may need to provide a credit score and income of the user 106 which may need to satisfy minimum score and income. In another example, to qualify for renting an apartment, a user 106 may need to provide a credit score and income of the user 106 which may again need to satisfy an eligibility criterion. In some cases, users 106 may not desire to share private and sensitive information to demonstrate their eligibility to perform data interactions 110 as it may lead to data theft, identity theft and targeted promotions.

Embodiments of the present disclosure discuss techniques that allow a user 106 to prove eligibility for a data interaction 110 without disclosing specific information otherwise needed to prove eligibility of the user 106. As further described in accordance with embodiments of the present disclosure, the disclosed techniques include using a zero-knowledge proof cryptographic technique to prove that the user 106 is eligible to perform a data interaction.

At least a portion of the computing infrastructure 102 (e.g., one or more computing nodes 104) may implement eligibility manager 150 which may be configured to verify eligibility of a user 106 in relation to a data interaction 110. The eligibility manager 150 comprises a processor 152, a memory 156, and a network interface 154. The eligibility manager 150 may be configured as shown in FIG. 1 or in any other suitable configuration.

The processor 152 comprises one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the eligibility manager 150. In this way, processor 152 may be a special-purpose computer designed to implement the functions disclosed herein. In one or more embodiments, the eligibility manager 150 is implemented using logic units, FPGAs, ASICs, DSPs, or any other suitable hardware. The eligibility manager 150 is configured to operate as described with reference to FIG. 2. For example, the processor 152 may be configured to perform at least a portion of the method 200 as described in FIG. 2.

The memory 156 comprises a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may comprise a read-only memory (ROM), random-access memory (RAM), ternary content-addressable memory (TCAM), dynamic random-access memory (DRAM), and static random-access memory (SRAM).

The memory 156 is operable to store instructions 158, configuration information 160, user eligibility information 172, eligibility results 174, zero-knowledge proofs 176, verification results 178, and any other data needed to performed operations of the eligibility manager 150 as described in embodiments of the present disclosure. The instructions 158 may include any suitable set of instructions, logic, rules, or code operable to execute the eligibility manager 150.

The network interface 154 is configured to enable wired and/or wireless communications. The network interface 154 is configured to communicate data between the eligibility manager 150 and other devices, systems, or domains (e.g., other computing nodes 104 etc.). For example, the network interface 154 may comprise a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 may be implemented like the jobs manager 150 shown in FIG. 1. For example, each of the computing nodes 104 may have a respective processor and a memory that stores data and instructions to perform a respective functionality of the computing node 104.

In one or more embodiments, the eligibility manager 150 may be configured to verify eligibility of a user 106 in relation to performing a data interaction 110 without the user 106 having to disclose user information (e.g., user eligibility information 172) needed to verify the eligibility of the user 106 to perform the data interaction 110. FIG. 1 shows an example eligibility workflow 120 for verifying eligibility of a user 106 to perform a data interaction 110. As shown in FIG. 1, the overall eligibility workflow 120 for verifying eligibility of a user 106 includes four different phases including configuration 122, evaluation 124, proof generation 126, and verification 128.

As part of configuration 122, the eligibility manager 150 defines configuration information 160 needed to execute the eligibility verification of the user 106. As shown in FIG. 1, the eligibility information 160 may include an evaluation algorithm 162, an encryption key 166, a proof algorithm 168, and a verify algorithm 170. The evaluation algorithm 162 is configured to determine eligibility of a user 106 for performing a particular data interaction 110 based on an eligibility criteria 164. The eligibility criteria 164 may include one or more criteria that the user 106 must satisfy to be eligible for performing the data interaction. For example, the evaluation algorithm 162 may be configured to determine whether a user 106 is eligible to rent a particular house. In this example, performing operations relating to renting the particular house (e.g., filling out online application, digitally signing documents etc.) may represent the data interaction 110. For this example, the eligibility criteria 164 associated with the evaluation algorithm 162 may define that a user 106 needs to have at least a minimum income to be eligible to rent an apartment.

In one embodiment, the evaluation algorithm 162 accepts encrypted user eligibility information 172 associated with a user 106 and evaluates the user eligibility information 172 based on the eligibility criteria 164 to determine the eligibility of the user 106 for performing the data interaction 110. User eligibility information 172 may include pieces of information associated with the user 106 that is to be evaluated against the eligibility criteria 164 to determine eligibility of the user 106 to perform the data interaction 110. The encryption key 166 is configured to be used to encrypt user eligibility information 172 provided by the user 106 to prove eligibility for performing the data interaction 110. In one embodiment, upon receiving the user eligibility information 172 from the user 106, eligibility manager 150 is configured to encrypt the user eligibility information 172 using the encryption key 166. The encrypted user eligibility information 172 is then input into the evaluation algorithm 162. The evaluation algorithm 162 is configured to evaluate the encrypted user eligibility information 172 based on the eligibility criteria 164 without decrypting the user eligibility information 172. This avoids disclosure of any sensitive and/or private user information that may be provided by the user 106 as part of the user eligibility information 172.

In one embodiment, the evaluation algorithm 162 is configured to output an eligibility result 174 that indicates whether the user 106 is found eligible to perform the data interaction 110. For example, the eligibility result may be a binary value (e.g., 0 or 1, true or false etc.), wherein one of the binary values (e.g., '0') may indicate that the user 106 is eligible and the other remaining binary value (e.g., '1') may indicate that the user 106 is ineligible.

As described in more detail below, the proof algorithm 168 is configured to generate a zero-knowledge proof 176 of the user's eligibility to perform the data interaction 110. For example, the proof algorithm 168 generates a zero-knowledge proof 176 based at least on the eligibility result 174 generated by the evaluation algorithm. Further, the verify algorithm 170 is configured to verify the zero-knowledge proof 176 generated using the proof algorithm 168. In one embodiment, the proof algorithm 168 and the verify algorithm 170 are cryptographic algorithms that are part of a Zero-Knowledge Succinct Non-Interactive Argument of Knowledge (ZK-SNARK) cryptographic method that is generally used to prove validity of a statement between a prover and a verifier without actually revealing any specific information beyond the validity of the statement itself. In one embodiment, the eligibility manager 150 generates certain public parameters as part of implementing the ZK-SNARK method and for use in generating and validating the zero-knowledge proof 176. Specifically, the eligibility manager 150 generates two public parameters (proving key '$S_p$' and verifying key '$S_v$') based on one or more of the eligibility criteria 164 and the encrypted user eligibility information 172 received from the user 106. As further described below, the proving key $S_p$ may be used by the proof algorithm 168 to generate the zero-knowledge proof 176, and the verifying key $S_v$ may be used by the verify algorithm 170 to validate the zero-knowledge proof 176 generated by the proof algorithm 168.

The evaluation 124 phase begins with a user 106 initiating a request 108 to determine an eligibility of the user 106 to perform the data interaction 110. The user 106 may initiate a request 108 using a user device (e.g., a computing node 104 such as mobile phone, laptop etc.). For example, the user 106 may use a user device (e.g., a computing node 104 such as mobile phone, laptop etc.) to login to a home listing service that includes a list of properties (e.g., houses, apartment complexes etc.) that are available for renting. Each home listing may have its own eligibility criteria 164 to qualify for renting. However, the home listing service may not disclose the eligibility criteria 164 associated with the home listings. To determine eligibility to rent the particular house, the user 106 may initiate a request 108 (e.g., from the user device) to determine eligibility of the user 106 to rent the particular house. For example, the user 106 may initiate the request 108 by selecting the particular house in the list of homes presented (e.g., on a web browser or mobile app) by the listing service.

In response to detecting that the request 108 has been initiated by the user 106 to determine eligibility of the user

106 to perform the data interaction 110, the eligibility manager 150 may be configured to prompt the user 106 to provide user eligibility information 172 associated with the user 106 needed to evaluate the user's eligibility based on the eligibility criteria 164. Following the above example, when eligibility criteria 164 to rent the house defines that the user 106 needs to have at least a minimum income to be eligible to rent the house, the eligibility manager 150 may prompt the user 106 to provide information relating to an income of the user 106. In one embodiment, prompting the user 106 may include presenting at least one question to the user 106. For example, the prompt to the user 106 may include a question that asks the user to select an income range from a plurality of income ranges. The user eligibility information 172 provided by the user 106 in response to the prompt may include an answer to the at least one question presented to the user 106. For example, the user eligibility information 172 provided by the user 106 may include an income range selected by the user 106 from the list of income ranges.

The eligibility manager 150 may be configured to encrypt the user eligibility information 172 received from the user 106. For example, upon receiving the user eligibility information 172 from the user 106, eligibility manager 150 encrypts the received user eligibility information 172 using the encryption key 166. This ensures that the specifics of the user eligibility information 172 (e.g., income range) is never disclosed during the entire eligibility determination process described below. The eligibility manager 150 inputs the encrypted user eligibility information 172 into the evaluation algorithm 162 to determine an eligibility result 174. The evaluation algorithm 162 is configured to evaluate the encrypted user eligibility information 172 based on the eligibility criteria 164 without decrypting the user eligibility information 172. Based on evaluating the encrypted user eligibility information 172 based on the eligibility criteria 164, the evaluation algorithm 162 is configured to output an eligibility result 174 that indicates whether the user 106 is found eligible to perform the data interaction 110. For example, the eligibility result may be a binary value (e.g., 0 or 1, true or false etc.), wherein one of the binary values (e.g., '0') may indicate that the user 106 is eligible and the other binary value (e.g., '1') may indicate that the user 106 is ineligible. Following the above example, upon receiving the income range from the user 106, the eligibility manager 150 encrypts the income range of the user 106 using the encryption key 166 and inputs the encrypted income range into the evaluation algorithm 162 which evaluates the eligibility of the user 106 based on the eligibility criteria 164 and outputs a binary value (e.g., 0 or 1) indicating whether the user 106 is eligible to rent the house. For example, when the income range of the user 106 equals or exceeds the minimum income needed to qualify, the evaluation algorithm outputs a value of '0' indicating that the user 106 is eligible. On the other hand, when the income range of the user 106 is lower than the minimum income, the evaluation algorithm outputs a value of '1' indicating that the user 106 is ineligible.

In one embodiment, the eligibility manager 150 may be configured to transmit an indication of the eligibility result 174 back to the user device. The indication is meant to inform the user 106 of whether the user is eligible to perform the data interaction 110 (e.g., rent the home).

In one or more embodiments, the eligibility manager 150 may be configured to generate a zero-knowledge proof 176 of the eligibility result 174. Essentially, the eligibility manager 150 may be configured to generate a zero-knowledge proof 176 of the eligibility of the user 106 to perform the data interaction 110. For example, when the eligibility result 174 indicates that the user 106 is eligible to perform the data interaction 110, the eligibility manager 150 generates a zero-knowledge proof 176 of this eligibility. The zero-knowledge proof 176 is meant to prove to an interested party that the user 106 satisfies the eligibility criteria 164 associated with the data interaction 110 and is eligible to perform the data interaction without disclosing the particular user eligibility information 172 associated with the user 106 that qualifies the user 106 to perform the data interaction 110. Following the above example, the eligibility manager 150 generates a zero-knowledge proof 176 that proves that the income of the user 106 satisfies the minimum income requirement needed to rent the house. It may be noted that the zero-knowledge proof 176 does not include the user eligibility information 172 (e.g., income of the user 106) provided by the user.

In one or more embodiments, the eligibility manager 150 may use the proof algorithm 168 to generate the zero-knowledge proof 176 of the eligibility result 174. As described above, the proof algorithm 168 is configured to generate a zero-knowledge proof 176 of the user's eligibility to perform the data interaction 110. In one embodiment, the proof algorithm 168 is configured to generate the zero-knowledge proof 176 of the user's eligibility to perform the data interaction 110 based on encrypted user eligibility information 172 and the eligibility result 174 generated by the evaluation algorithm 162. For example, the eligibility manager 150 may input the encrypted user eligibility information 172 and the eligibility result 174 into the proof algorithm 168 and obtain the zero-knowledge proof 176 as a result of the proof algorithm 168. In an alternative or additional embodiment, the proof algorithm 168 is configured to generate the zero-knowledge proof 176 of the user's eligibility to perform the data interaction 110 based on encrypted user eligibility information 172, the eligibility result 174 generated by the evaluation algorithm 162, and the proving key $S_p$ generated during the configuration 122 phase. For example, the eligibility manager 150 may input the encrypted user eligibility information 172, the eligibility result 174, and the proving key $S_p$ into the proof algorithm 168 and obtain the zero-knowledge proof 176 as a result of the proof algorithm 168. It may be noted that, the user eligibility information 172 may be encrypted using the encryption key 166 or some other public key. Following the above example, the eligibility manager 150 may input the encrypted income range of the user 106, the binary value '0' indicating that the user is eligible, and the proving key $S_p$ into the proof algorithm 168 and obtain the zero-knowledge proof 176 as a result of the proof algorithm 168.

In one embodiment, eligibility manager 150 may be configured to generate the zero-knowledge proof 176 of the eligibility result 174 associated with the user 106, in response to receiving a request from the user 106 to generate the zero-knowledge proof 176. For example, once the user 106 determines, based on an indication generated by the eligibility manager 150, that the user 106 is eligible to rent the house, the user 106 may request generation of the zero-knowledge proof 176 of the eligibility result 174 for later use in formally applying for renting the house.

In one or more embodiments, the eligibility manager 150 may be configured to validate the zero-knowledge proof 176 generated using the proof algorithm. A successful validation of the zero-knowledge proof 176 indicates that the zero-knowledge proof 176 is valid and that the user 106 has proved eligibility to perform the data interaction 110. In one embodiment, eligibility manager 150 may be configured to initiate verification of the zero-knowledge proof 176, in response to receiving a request 109 from the user 106 to perform the data interaction. For example, once the user 106 determines, based on an indication generated by the eligibility manager 150, that the user 106 is eligible to rent the house, the user 106 may proceed to launch a formal application to rent the house. This may include the user 106 clicking on an "Apply" button on the web interface on the user device. In this example, the act of clicking the "Apply" button may initiate the request 109 to perform the data interaction 110.

The eligibility manager 150 may be configured to verify the validity of the zero-knowledge proof 176 using the verify algorithm 170. As described above, the verify algorithm 170 is configured to verify the zero-knowledge proof 176 generated using the proof algorithm 168 without knowledge of the specific user eligibility information 172. In other words, the verify algorithm 170 may determine the eligibility of the user 106 to perform the data interaction 110 without knowledge of the specific user eligibility information 172 that proves the eligibility of the user 106. In one embodiment, the eligibility manager 150 may input the zero-knowledge proof 176 into the verify algorithm 170 and obtain a verification result 178. In an alternative or additional embodiment, the eligibility manager 150 may input the zero-knowledge proof 176 and the verify key $S_v$ generating during configuration into the verify algorithm 170 and obtain a verification result 178.

In an embodiment, the verification result 178 may be a binary value (e.g., 0 or 1, true or false etc.), wherein one of the binary values (e.g., '1') may indicate that the zero-knowledge proof 176 is valid and the other binary value (e.g., '0') may indicate that the zero-knowledge proof 176 is invalid. A valid zero-knowledge proof 176 indicates that the user 106 is eligible to perform the data interaction. For example, a valid zero-knowledge proof 176 indicates that the user 106 is eligible to rent the house. In one embodiment, in response to determining that the zero-knowledge proof 176 is valid, the eligibility manager 150 may initiate processing the data interaction 110 requested by the user 106. For example, in response to determining that the zero-knowledge proof 176 is valid, the eligibility manager 150 may initiate processing the rent application received from the user 106 as part of the request 109.

As may be appreciated from the above disclosure, at no time during the evaluation 124, proof generation 126 and verification 128 phases is the user eligibility information 172 or any portion thereof is disclosed to an entity that verifies the user's eligibility to perform the data interaction or processes the requested data interaction for the user 106. This raises the overall data privacy and data security of the computing network and avoids theft of sensitive and private user data.

Figure 2:
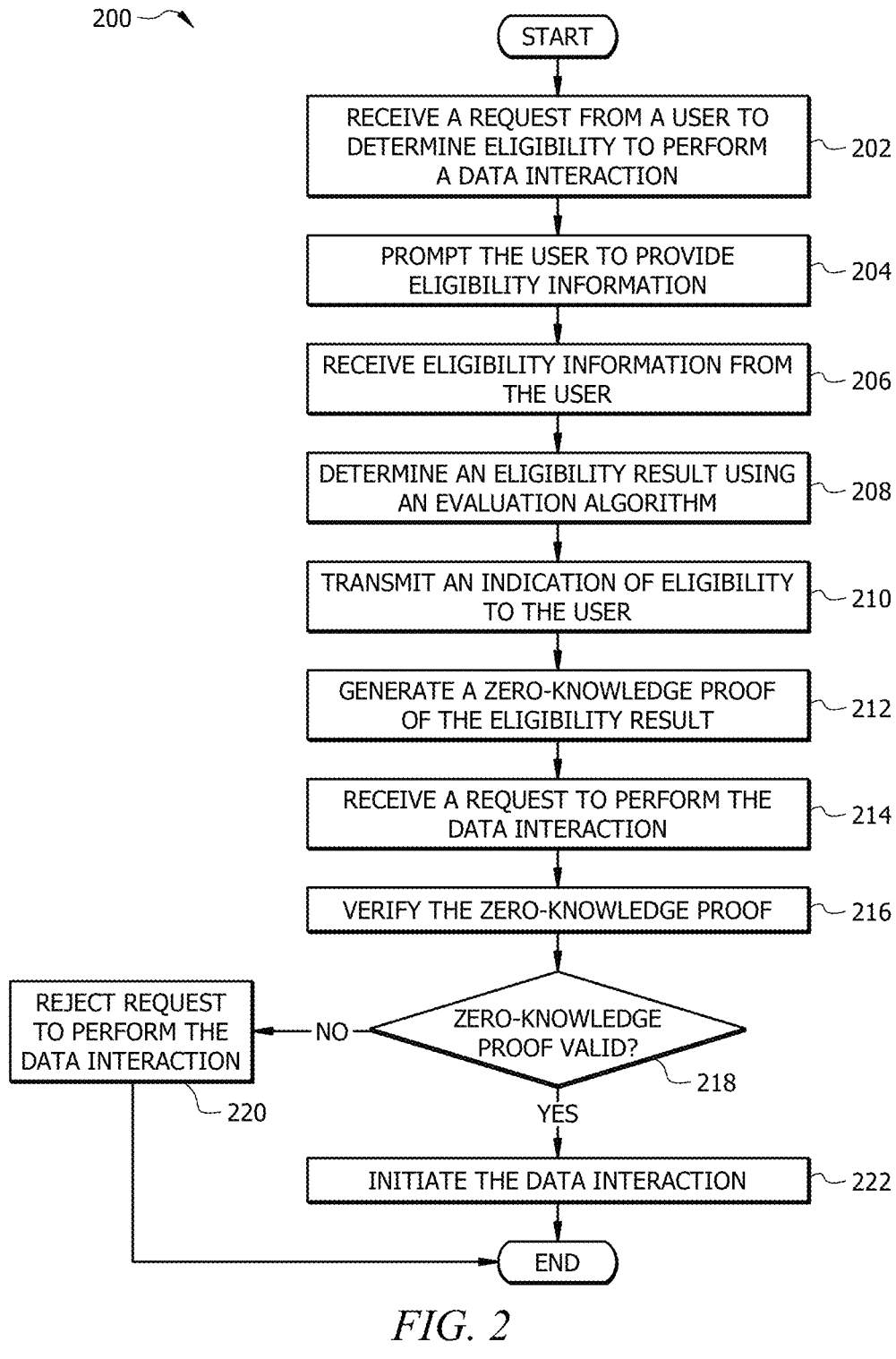
FIG. 2 illustrates a flowchart of an example method for verifying eligibility of a user in relation to a data interaction, in accordance with one or more embodiments of the present disclosure.

FIG. 2 illustrates a flowchart of an example method 200 for verifying eligibility of a user 106 in relation to a data interaction 110, in accordance with one or more embodiments of the present disclosure. Method 200 may be performed by the eligibility manager 150 shown in FIG. 1.

At operation 202, the eligibility manager 150 receives, from a computing node 104 associated with a user 106, a request 108 from the user 106 to determine eligibility of the user 106 to perform a data interaction 110.

As described above, the evaluation 124 phase begins with a user 106 initiating a request 108 to determine an eligibility of the user 106 to perform the data interaction 110. The user 106 may initiate a request 108 using a user device (e.g., a computing node 104 such as mobile phone, laptop etc.). For example, the user 106 may use a user device (e.g., a computing node 104 such as mobile phone, laptop etc.) to login to a home listing service that includes a list of properties (e.g., houses, apartment complexes etc.) that are available for renting. Each home listing may have its own eligibility criteria 164 to qualify for renting. However, the home listing service may not disclose the eligibility criteria 164 associated with the home listings. To determine eligibility to rent the particular house, the user 106 may initiate a request 108 (e.g., from the user device) to determine eligibility of the user 106 to rent the particular house. For example, the user 106 may initiate the request 108 by selecting the particular house in the list of homes presented (e.g., on a web browser or mobile app) by the listing service.

At operation 204, in response to receiving the request 108, the eligibility manager 150 prompts the user 106 to provide eligibility information (e.g., user eligibility information 172) associated with the user 106, wherein the user 106 is eligible to perform the data interaction 110 when the eligibility information associated with the user 106 satisfies the eligibility criteria 164.

At operation 206, the eligibility manager 150 receives the eligibility information (e.g., user eligibility information 172) from the user 106.

As described above, in response to detecting that the request 108 has been initiated by the user 106 to determine eligibility of the user 106 to perform the data interaction 110, the eligibility manager 150 may be configured to prompt the user 106 to provide user eligibility information 172 associated with the user 106 needed to evaluate the user's eligibility based on the eligibility criteria 164. Following the above example, when eligibility criteria 164 to rent the house defines that the user 106 needs to have at least a minimum income to be eligible to rent the house, the eligibility manager 150 may prompt the user 106 to provide information relating to an income of the user 106. In one embodiment, prompting the user 106 may include presenting at least one question to the user 106. For example, the prompt to the user 106 may include a question that asks the user to select an income range from a plurality of income ranges. The user eligibility information 172 provided by the user 106 in response to the prompt may include an answer to the at least one question presented to the user 106. For example, the user eligibility information 172 provided by the user 106 may include an income range selected by the user 106 from the list of income ranges.

The eligibility manager 150 may be configured to encrypt the user eligibility information 172 received from the user 106. For example, upon receiving the user eligibility information 172 from the user 106, eligibility manager 150 encrypts the received user eligibility information 172 using the encryption key 166. This ensures that the specifics of the user eligibility information 172 (e.g., income range) is never disclosed during the entire eligibility determination process described below.

At operation 208, the eligibility manager 150 determines an eligibility result 174 by inputting the eligibility information (e.g., user eligibility information 172) into the evaluation algorithm 162, wherein the eligibility result 174 indicates the eligibility of the user 106 to perform the data interaction 110 based on the eligibility criteria 164.

As described above, the eligibility manager 150 inputs the encrypted user eligibility information 172 into the evaluation algorithm 162 to determine an eligibility result 174. The evaluation algorithm 162 is configured to evaluate the encrypted user eligibility information 172 based on the eligibility criteria 164 without decrypting the user eligibility information 172. Based on evaluating the encrypted user eligibility information 172 based on the eligibility criteria 164, the evaluation algorithm 162 is configured to output an eligibility result 174 that indicates whether the user 106 is found eligible to perform the data interaction 110. For example, the eligibility result may be a binary value (e.g., 0 or 1, true or false etc.), wherein one of the binary values (e.g., '0') may indicate that the user 106 is eligible and the other binary value (e.g., '1') may indicate that the user 106 is ineligible. Following the above example, upon receiving the income range from the user 106, the eligibility manager 150 encrypts the income range of the user 106 using the encryption key 166 and inputs the encrypted income range into the evaluation algorithm 162 which evaluates the eligibility of the user 106 based on the eligibility criteria 164 and outputs a binary value (e.g., 0 or 1) indicating whether the user 106 is eligible to rent the house. For example, when the income range of the user 106 equals or exceeds the minimum income needed to qualify, the evaluation algorithm outputs a value of '0' indicating that the user 106 is eligible. On the other hand, when the income range of the user 106 is lower than the minimum income, the evaluation algorithm outputs a value of '1' indicating that the user 106 is ineligible.

At operation 210, in response to determining that the user 106 is eligible to perform the data interaction 110, the eligibility manager 150 transmits an indication of the eligibility to the computing node 104 associated with the user 106.

As described above, the eligibility manager 150 may be configured to transmit an indication of the eligibility result 174 back to the user device. The indication is meant to inform the user 106 of whether the user is eligible to perform the data interaction 110 (e.g., rent the home).

At operation 212, the eligibility manager 150 generates a zero-knowledge proof 176 of the eligibility of the user 106 to perform the data interaction 110, wherein the zero-knowledge proof 176 does not include the eligibility information (e.g., user eligibility information 172) received from the user 106.

As described above, in one or more embodiments, the eligibility manager 150 may be configured to generate a zero-knowledge proof 176 of the eligibility result 174. Essentially, the eligibility manager 150 may be configured to generate a zero-knowledge proof 176 of the eligibility of the user 106 to perform the data interaction 110. For example, when the eligibility result 174 indicates that the user 106 is eligible to perform the data interaction 110, the eligibility manager 150 generates a zero-knowledge proof 176 of this eligibility. The zero-knowledge proof 176 is meant to prove to an interested party that the user 106 satisfies the eligibility criteria 164 associated with the data interaction 110 and is eligible to perform the data interaction without disclosing the particular user eligibility information 172 associated with the user 106 that qualifies the user 106 to perform the data interaction 110. Following the above example, the eligibility manager 150 generates a zero-knowledge proof 176 that proves that the income of the user 106 satisfies the minimum income requirement needed to rent the house. It may be noted that the zero-knowledge proof 176 does not include the user eligibility information 172 (e.g., income of the user 106) provided by the user.

In one or more embodiments, the eligibility manager 150 may use the proof algorithm 168 to generate the zero-knowledge proof 176 of the eligibility result 174. As described above, the proof algorithm 168 is configured to generate a zero-knowledge proof 176 of the user's eligibility to perform the data interaction 110. In one embodiment, the proof algorithm 168 is configured to generate the zero-knowledge proof 176 of the user's eligibility to perform the data interaction 110 based on encrypted user eligibility information 172 and the eligibility result 174 generated by the evaluation algorithm 162. For example, the eligibility manager 150 may input the encrypted user eligibility information 172 and the eligibility result 174 into the proof algorithm 168 and obtain the zero-knowledge proof 176 as a result of the proof algorithm 168. In an alternative or additional embodiment, the proof algorithm 168 is configured to generate the zero-knowledge proof 176 of the user's eligibility to perform the data interaction 110 based on encrypted user eligibility information 172, the eligibility result 174 generated by the evaluation algorithm 162, and the proving key $S_p$ generated during the configuration 122 phase. For example, the eligibility manager 150 may input the encrypted user eligibility information 172, the eligibility result 174, and the proving key $S_p$ into the proof algorithm 168 and obtain the zero-knowledge proof 176 as a result of the proof algorithm 168. It may be noted that, the user eligibility information 172 may be encrypted using the encryption key 166 or some other public key. Following the above example, the eligibility manager 150 may input the encrypted income range of the user 106, the binary value '0' indicating that the user is eligible, and the proving key $S_p$ into the proof algorithm 168 and obtain the zero-knowledge proof 176 as a result of the proof algorithm 168.

In one embodiment, eligibility manager 150 may be configured to generate the zero-knowledge proof 176 of the eligibility result 174 associated with the user 106, in response to receiving a request from the user 106 to generate the zero-knowledge proof 176. For example, once the user 106 determines, based on an indication generated by the eligibility manager 150, that the user 106 is eligible to rent the house, the user 106 may request generation of the zero-knowledge proof 176 of the eligibility result 174 for later use in formally applying for renting the house.

At operation 214, the eligibility manager 150 receives a request 109 from the user to perform the data interaction 110.

At operation 216, in response to receiving the request 109 to perform the data interaction 110, the eligibility manager 150 verifies the zero-knowledge proof 176 of the eligibility of the user 106 to perform the data interaction 110 by running a verification algorithm (e.g., verify algorithm 170).

As described above, the eligibility manager 150 may be configured to validate the zero-knowledge proof 176 generated using the proof algorithm. A successful validation of the zero-knowledge proof 176 indicates that the zero-knowledge proof 176 is valid and that the user 106 has proved eligibility to perform the data interaction 110. In one embodiment, eligibility manager 150 may be configured to initiate verification of the zero-knowledge proof 176, in response to receiving a request 109 from the user 106 to perform the data interaction. For example, once the user 106 determines, based on an indication generated by the eligibility manager 150, that the user 106 is eligible to rent the house, the user 106 may proceed to launch a formal application to rent the house. This may include the user 106 clicking on an "Apply" button on the web interface on the user device. In this example, the act of clicking the "Apply" button may initiate the request 109 to perform the data interaction 110.

The eligibility manager 150 may be configured to verify the validity of the zero-knowledge proof 176 using the verify algorithm 170. As described above, the verify algorithm 170 is configured to verify the zero-knowledge proof 176 generated using the proof algorithm 168 without knowledge of the specific user eligibility information 172. In other words, the verify algorithm 170 may determine the eligibility of the user 106 to perform the data interaction 110 without knowledge of the specific user eligibility information 172 that proves the eligibility of the user 106. In one embodiment, the eligibility manager 150 may input the zero-knowledge proof 176 into the verify algorithm 170 and obtain a verification result 178. In an alternative or additional embodiment, the eligibility manager 150 may input the zero-knowledge proof 176 and the verify key $S_v$ generating during configuration into the verify algorithm 170 and obtain a verification result 178.

In an embodiment, the verification result 178 may be a binary value (e.g., 0 or 1, true or false etc.), wherein one of the binary values (e.g., '1') may indicate that the zero-knowledge proof 176 is valid and the other binary value (e.g., '0') may indicate that the zero-knowledge proof 176 is invalid.

At operation 218, the eligibility manager 150 checks whether the zero-knowledge proof 176 is valid. When the zero-knowledge proof 176 is determined to be invalid, the method 200 proceeds to operation 220 where the eligibility manager 150 rejects the request 109 from the user 106 to perform the data interaction 110. On the other hand, when the zero-knowledge proof 176 is determined to be valid, the method 200 proceeds to operation 222.

At operation 222, in response to determining that the zero-knowledge proof is valid, the eligibility manager 150 initiates the data interaction 110 requested by the user 106.

As described above, a valid zero-knowledge proof 176 indicates that the user 106 is eligible to perform the data interaction. For example, a valid zero-knowledge proof 176 indicates that the user 106 is eligible to rent the house. In one embodiment, in response to determining that the zero-knowledge proof 176 is valid, the eligibility manager 150 may initiate processing the data interaction 110 requested by the user 106. For example, in response to determining that the zero-knowledge proof 176 is valid, the eligibility manager 150 may initiate processing the rent application received from the user 106 as part of the request 109.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a memory that stores an evaluation algorithm configured to determine eligibility for performing a data interaction based on an eligibility criteria; and
   a processor communicatively coupled to the memory and configured to:
      receive, from a computing node associated with a user, a first request from the user to determine eligibility of the user to perform the data interaction;
      in response to receiving the first request, prompt the user to provide eligibility information associated with the user, wherein the user is eligible to perform the data interaction when the eligibility information associated with the user satisfies the eligibility criteria;
      receive the eligibility information from the user;
      determine an eligibility result by inputting the eligibility information into the evaluation algorithm, wherein the eligibility result indicates the eligibility of the user to perform the data interaction based on the eligibility criteria;
      in response to determining that the user is eligible to perform the data interaction, transmit an indication of the eligibility to the computing node;
      generate a zero-knowledge proof of the eligibility of the user to perform the data interaction, wherein the zero-knowledge proof does not include the eligibility information received from the user;
      receive a second request from the user to perform the data interaction;
      in response to receiving the second request to perform the data interaction, verify the zero-knowledge proof of the eligibility of the user to perform the data interaction by running a verification algorithm;
      in response to determining that the zero-knowledge proof is valid, initiate the data interaction requested by the user.

2. The system of claim 1, wherein the processor is further configured to:
   receive a third request from the user to generate the zero-knowledge proof of the eligibility of the user to perform the data interaction; and
   generate the zero-knowledge proof in response to receiving the third request to generate the zero-knowledge proof.

3. The system of claim 1, wherein the processor is further configured to:
   encrypt the eligibility information based on an encryption key; and
   input the encrypted eligibility information into the evaluation algorithm for determining the eligibility of the user to perform the data interaction.

4. The system of claim 1, wherein:
   the prompt comprises at least one question; and
   the eligibility information received from the user comprises an answer to the at least one question.

5. The system of claim 1, wherein:
   a result of the evaluation algorithm indicating the eligibility of the user comprises a binary value;

a first binary value indicates that the user is eligible to perform the data interaction; and the remaining binary value indicates that the user is ineligible to perform the data interaction.

6. The system of claim 1, wherein the processor is further configured to use a Zero-Knowledge Succinct Non-interactive Argument of Knowledge algorithm to generate the zero-knowledge proof of the eligibility of the user to perform the data interaction and verify the zero-knowledge proof.

7. The system of claim 1, wherein the processor is further configured to:

encrypt the eligibility information based on an encryption key; and generate the zero-knowledge proof based on the encrypted eligibility information and the eligibility result indicating the eligibility of the user to perform the data interaction.

8. A method for evaluating eligibility, the method comprising:

receive, from a computing node associated with a user, a first request from the user to determine eligibility of the user to perform a data interaction;

in response to receiving the first request, prompt the user to provide eligibility information associated with the user, wherein the user is eligible to perform the data interaction when the eligibility information associated with the user satisfies an eligibility criteria;

receive the eligibility information from the user;

determine an eligibility result by inputting the eligibility information into an evaluation algorithm, wherein:

the evaluation algorithm is configured to determine eligibility for performing the data interaction based on the eligibility criteria; and the eligibility result indicates the eligibility of the user to perform the data interaction based on the eligibility criteria;

in response to determining that the user is eligible to perform the data interaction, transmit an indication of the eligibility to the computing node;

generate a zero-knowledge proof of the eligibility of the user to perform the data interaction, wherein the zero-knowledge proof does not include the eligibility information received from the user;

receive a second request from the user to perform the data interaction;

in response to receiving the second request to perform the data interaction, verify the zero-knowledge proof of the eligibility of the user to perform the data interaction by running a verification algorithm;

in response to determining that the zero-knowledge proof is valid, initiate the data interaction requested by the user.

9. The method of claim 8, further comprising:

receiving a third request from the user to generate the zero-knowledge proof of the eligibility of the user to perform the data interaction; and generating the zero-knowledge proof in response to receiving the third request to generate the zero-knowledge proof.

10. The method of claim 8, further comprising:

encrypting the eligibility information based on an encryption key; and inputting the encrypted eligibility information into the evaluation algorithm for determining the eligibility of the user to perform the data interaction.

11. The method of claim 8, wherein:

the prompt comprises at least one question; and the eligibility information received from the user comprises an answer to the at least one question.

12. The method of claim 8, wherein:

a result of the evaluation algorithm indicating the eligibility of the user comprises a binary value;

a first binary value indicates that the user is eligible to perform the data interaction; and the remaining binary value indicates that the user is ineligible to perform the data interaction.

13. The method of claim 8, further comprising using a Zero-Knowledge Succinct Non-interactive Argument of Knowledge algorithm to generate the zero-knowledge proof of the eligibility of the user to perform the data interaction and verify the zero-knowledge proof.

14. The method of claim 8, further comprising:

encrypting the eligibility information based on an encryption key; and generate the zero-knowledge proof based on the encrypted eligibility information and the eligibility result indicating the eligibility of the user to perform the data interaction.

15. A non-transitory computer-readable medium storing instructions that when executed by a processor causes the processor to:

receive, from a computing node associated with a user, a first request from the user to determine eligibility of the user to perform a data interaction;

in response to receiving the first request, prompt the user to provide eligibility information associated with the user, wherein the user is eligible to perform the data interaction when the eligibility information associated with the user satisfies an eligibility criteria;

receive the eligibility information from the user;

determine an eligibility result by inputting the eligibility information into an evaluation algorithm, wherein:

the evaluation algorithm is configured to determine eligibility for performing the data interaction based on the eligibility criteria; and the eligibility result indicates the eligibility of the user to perform the data interaction based on the eligibility criteria;

in response to determining that the user is eligible to perform the data interaction, transmit an indication of the eligibility to the computing node;

generate a zero-knowledge proof of the eligibility of the user to perform the data interaction, wherein the zero-knowledge proof does not include the eligibility information received from the user;

receive a second request from the user to perform the data interaction;

in response to receiving the second request to perform the data interaction, verify the zero-knowledge proof of the eligibility of the user to perform the data interaction by running a verification algorithm;

in response to determining that the zero-knowledge proof is valid, initiate the data interaction requested by the user.

16. The non-transitory computer-readable medium of claim 15, wherein the instructions further cause the processor to:

receive a third request from the user to generate the zero-knowledge proof of the eligibility of the user to perform the data interaction; and generate the zero-knowledge proof in response to receiving the third request to generate the zero-knowledge proof.

17. The non-transitory computer-readable medium of claim 15, wherein the instructions further cause the processor to:

encrypt the eligibility information based on an encryption key; and input the encrypted eligibility information into the evaluation algorithm for determining the eligibility of the user to perform the data interaction.

18. The non-transitory computer-readable medium of claim 15, wherein:

the prompt comprises at least one question; and the eligibility information received from the user comprises an answer to the at least one question.

19. The non-transitory computer-readable medium of claim 15, wherein:

a result of the evaluation algorithm indicating the eligibility of the user comprises a binary value;

a first binary value indicates that the user is eligible to perform the data interaction; and the remaining binary value indicates that the user is ineligible to perform the data interaction.

20. The non-transitory computer-readable medium of claim 15, wherein the instructions further cause the processor to use a Zero-Knowledge Succinct Non-interactive Argument of Knowledge algorithm to generate the zero-knowledge proof of the eligibility of the user to perform the data interaction and verify the zero-knowledge proof.

* * * * *